April 28, 1959  F. I. JOHNSON  2,883,942
GROUPING CONVEYOR MECHANISM
Filed Feb. 28, 1956  2 Sheets-Sheet 1
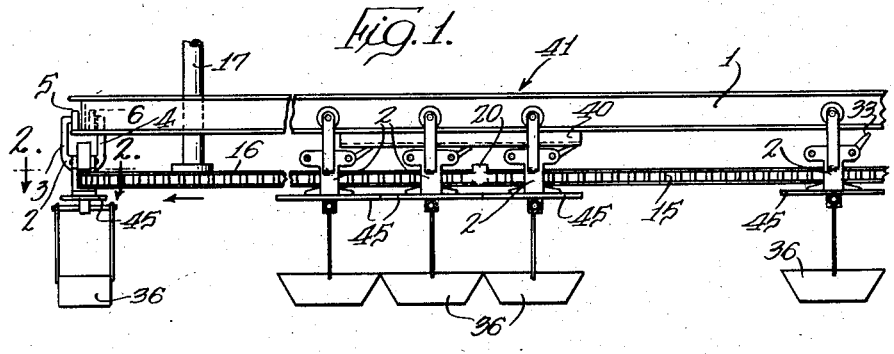
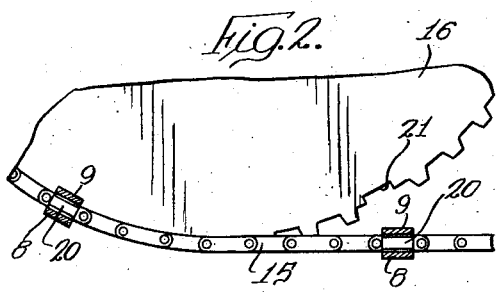
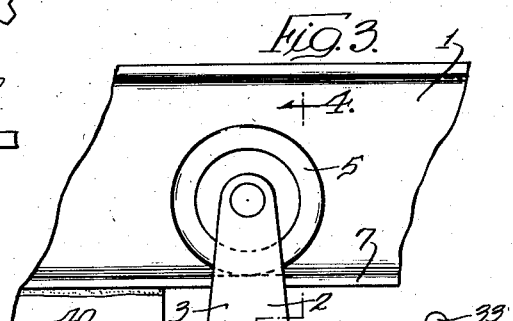
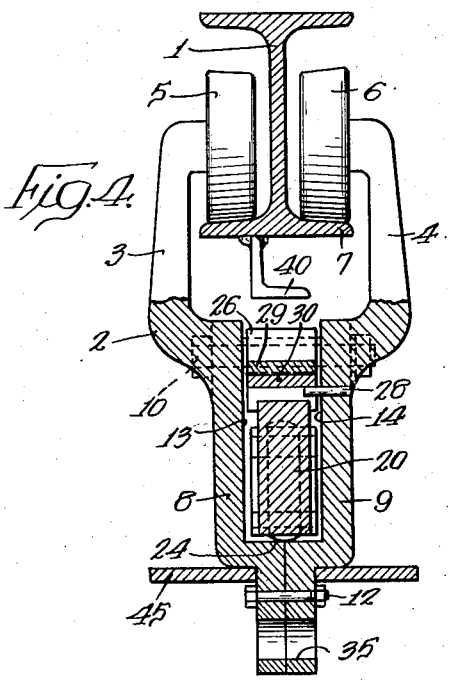
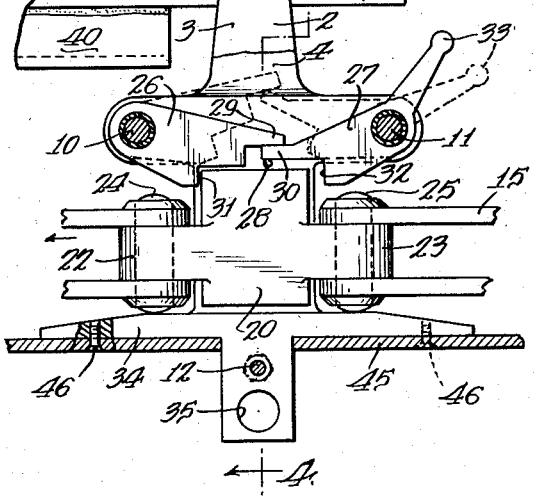
INVENTOR.
Fred I. Johnson
BY Schroeder, Hofgren,
Brady & Wegner
Attys.

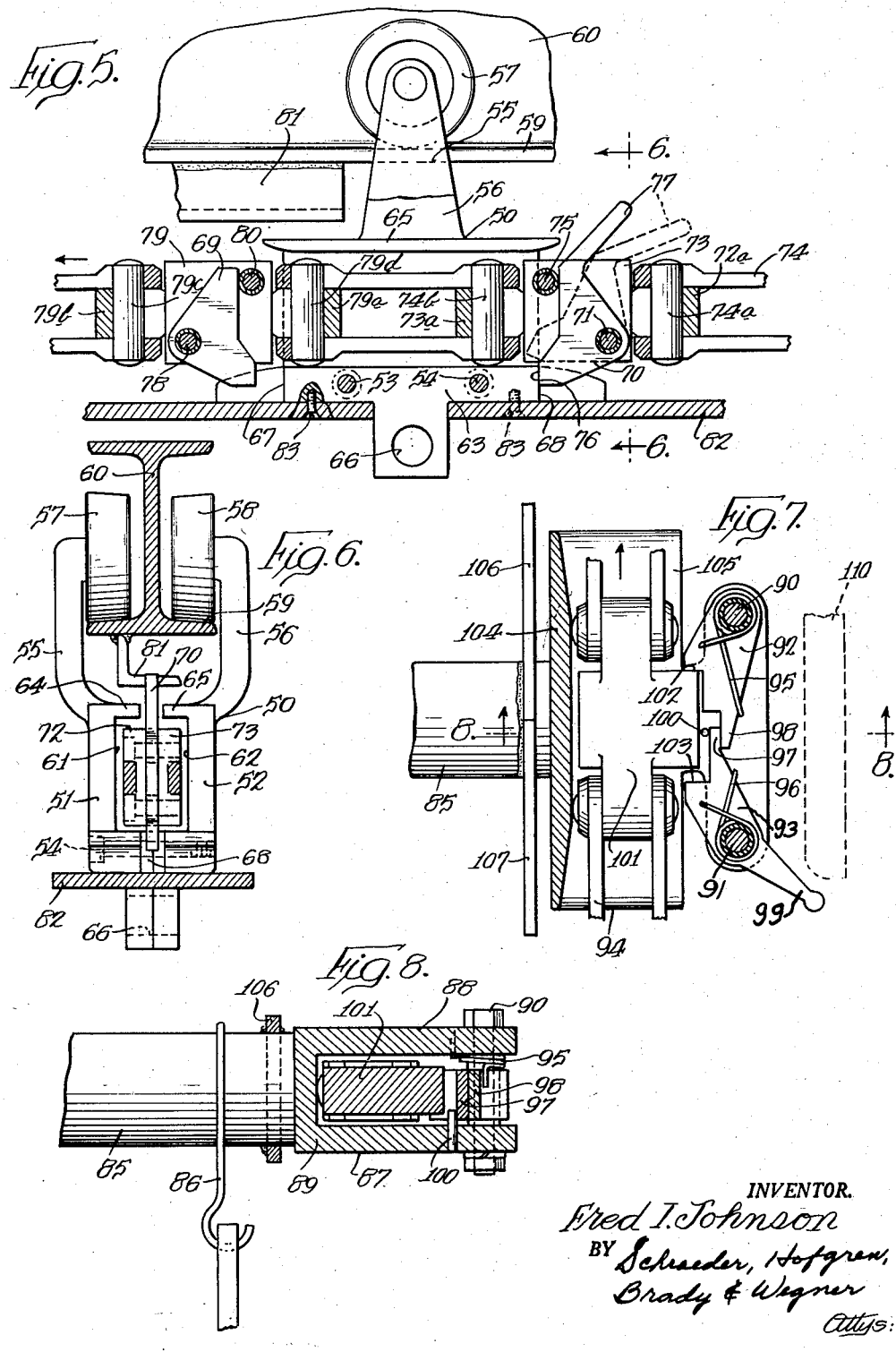

United States Patent Office 2,883,942
Patented Apr. 28, 1959

2,883,942
GROUPING CONVEYOR MECHANISM
Fred I. Johnson, Elmhurst, Ill.
Application February 28, 1956, Serial No. 568,403
4 Claims. (Cl. 104—172)

This invention relates to a conveyor mechanism and, more particularly, to a grouping conveyor mechanism.

An object of this invention is to provide a new and improved grouping conveyor mechanism.

Another object of this invention is to provide a conveyor mechanism for conveying articles at a desired distance apart during part of their travel and for grouping said articles at a lesser distance apart in a grouping area.

Another object of the invention is to provide a conveyor mechanism wherein articles supported on the conveyor may be closely grouped together in a grouping area wherein industrial processing operations such as paint baking may be carried out or where bulk materials may be handled by having carrying trays grouped together for continuous loading and then subsequently conveying the articles at a desired greater distance apart such as may be needed to clear inclines and horizontal turns in the conveyor.

Another object of this invention is to provide a mechanism wherein trolleys on a conveyor may be released from their drive chain and grouped closely together in any desired grouping area where they will have a slow intermittent motion and to then subsequently reattach the trolleys one by one to the chain with their original spacing so that they may be carried away.

Another object of the invention is to provide a mechanism as defined in the preceding paragraph wherein the means releasably connecting the trolleys to the chain includes a dog member and a drive block member, one of the members being mounted on the trolley and the other member on the chain, a trip bar located at the grouping area positioned for engagement by the dog member to shift the dog member and release the trolley from the chain, and spacer means carried on each trolley to maintain minimum spacing between the trolleys in the grouping area and to cause intermittent movement of the trolleys in said area in response to the entering of subsequent trolleys into said area which results in moving preceding trolleys out of said area and into position to again commence traveling with the chain.

A further object of the invention is to provide a grouping conveyor mechanism having a guide rail defining a path of travel, a drive chain generally coextensive with the guide rail and having drive blocks spaced along the chain, a plurality of trolleys mounted on the guide rail and each having means defining an aperture through which the chain and drive blocks may pass, each of the trolleys having a drive dog member and a hold back dog member pivotally mounted thereon and extending toward each other, said dog members having interengaging parts and abutments selectively engageable with one of said drive blocks, spacer means on the trolley for determining minimum distance between the trolleys in the grouping area, means for supporting an article on the trolley and a trip bar positioned at a grouping area to engage and move said dog members on each trolley in said area and to maintain the dog members out of engagement with the drive blocks on the chain.

Another object of the invention is to provide a grouping conveyor mechanism having a guide rail and trolleys movably mounted thereon, abutments on each trolley, spaced-apart dog members pivotally mounted on a chain for connecting the trolleys to the chain for movement therewith, means pivotally mounting the dog members on the chain, and means positioned at a grouping area for releasing the dog member from engagement with an abutment and maintaining said dog member in released position to permit continued movement of the chain without resultant movement of the trolley.

Another object of the invention is to provide a cross bar conveyor in which a cross bar has means at an end supporting the cross bar for movement, said means including a trolley having an aperture through which a chain may pass, a pair of dogs pivotally mounted on the trolley, means for urging the dogs toward the aperture so as to engage a drive block carried on the chain, means for limiting the movement of the dog members toward the aperture, and a trip bar at a grouping area positioned to engage and release said dog members from engagement with a drive block so as to permit continued movement of the chain without movement of the cross bar and trolley.

The objects of the invention generally set forth, together with other ancillary advantages, are attained by the construction and arrangement shown by way of illustration in the accompanying drawing, in which:

Fig. 1 is a view in elevation of the preferred embodiment of the grouping conveyor mechanism;

Fig. 2 is a horizontal fragmentary section taken along the line 2—2 in Fig. 1;

Fig. 3 is a fragmentary view of the mechanism shown in Fig. 1 on an enlarged scale;

Fig. 4 is a vertical section taken along the line 4—4 in Fig. 3;

Fig. 5 is a view similar to Fig. 3 but in a modified form of the invention;

Fig. 6 is a vertical section taken along the line 6—6 in Fig. 5;

Fig. 7 is a fragmentary plan view of another embodiment of a grouping conveyor mechanism of the cross bar type; and Fig. 8 is a vertical section taken along the line 8—8 in Fig. 7.

While this invention is susceptible of embodiment in many different forms, there is shown in the drawings and will herein be described in detail a preferred embodiment and two modifications of the invention with the understanding that the present disclosure is to be considered as an exemplification of the principles of the invention and is not intended to limit the invention to the embodiments illustrated. The scope of the invention will be pointed out in the appended claims.

In the preferred embodiment of Figs. 1 to 4, an I-shaped guide rail 1 defines a path of travel for the articles to be conveyed. A plurality of trolleys 2 are movably mounted on the guide rail and, more particularly, each trolley has wheel support horns 3 and 4 rotatably mounting rollers 5 and 6, respectively, for rolling engagement with a lower flange 7 of the I-shaped guide rail 1.

Each trolley may be of a two-piece construction; namely, parts 8 and 9 of which the horns 3 and 4, respectively, are a part and the two parts may be held together by pin members such as bolts 10, 11 and 12. The lower sections of parts 8 and 9 are spaced apart so as to define an aperture or housing having side walls 13 and 14, respectively, through which a trolley advancing means or drive element, such as a chain 15, may extend. The chain 15 is supported and driven by sprockets one of which is indicated at 16 and which is mounted on a drive shaft 17 rotatable by a source of power (not shown).

The chain 15 has drive blocks 20 positioned therealong at distances apart equal to the desired distance between trolleys during conveying movement thereof. As shown in Fig. 2, the sprockets may be relieved as at 21 to provide space for the trolleys. Alternatively, the drive blocks 20 may be formed of parts that can be inserted anywhere into the chain links to provide the desired spacing.

Each of the drive blocks 20 is of a size to pass through the trolley aperture formed by the side walls 13 and 14 and has leading and trailing ears 22 and 23, respectively, which are apertured to permit connection thereof with the lengths of chain 15 by pins 24 and 25.

The pin members 10 and 11 provide pivots for a drive dog member 26 and a hold back dog member 27, respectively. With the chain 15 traveling in the direction of the arrow in Fig. 3, it will be apparent that the trolley is driven by the engagement between dog member 26 and drive block 20. These dog members are normally urged toward the trolley aperture by gravity, and their movement is limited by a stop pin 28 mounted in the side part 9 of the trolley. The dog members have interengaging parts 29 and 30 so that they pivot together and abutment surfaces 31 and 32 positioned for engagement with the drive block 20 on the chain 15. The normal function of abutment 32 is to prevent the trolley from moving forward on the chain when going downhill.

The hold back dog member 27 has an upwardly extending trip 33 for a purpose more fully set forth hereinafter.

Each trolley has a guide shoe 34 extending beneath and beyond the aperture to properly guide the chain 15 through the aperture when they move relative to each other. An eye 35 is provided at the lower end of each trolley for supporting an article to be conveyed such as trays 36 shown in Fig. 1.

For regular conveying of articles, it is necessary that the trolleys 2 be spaced an adequate distance apart so that there is sufficient distance between articles to clear inclines, horizontal turns and other configurations of the guide rail 1 and, as disclosed, this is accomplished by the spacing of the drive blocks 20 on the chain 15. However, during certain industrial processing operations or in the handling of bulk materials, it is desirable to closely group together a number of articles and to maintain them in such a grouped relation for an extended period of time. In order to accomplish this grouping at a desired grouping area, a trip member in the form of a trip bar 40 may be secured to the underside of the guide rail 1 as by welding and the length of the trip bar 40 determines the number of trolleys 2 that may be collected in a grouping area indicated generally at 41 in Fig. 1. The trip bar is positioned so as to engage the trip 33 on the hold back dog member 27 when the trolley moves to a position along the guide rail where the trip bar 40 is located which results in pivoting of the tail dog 27 as well as the drive dog member 26 through the interengaging parts 29 and 30. This results in freeing the drive dog member abutment 31 from the drive block 20 and moving the abutment 32 on the hold back dog member to an out-of-the-way position. The position of the dog members when engaged by the trip bar 40 is shown in dotted lines in Fig. 3.

With the grouping area full of trolleys, the entry of a succeeding trolley into this area results in advancing the first trolley in the area away therefrom which releases the trip 33 from the trip bar 40 so that the dog members 26 and 27 return to positions against the stop pin 28 and subsequently reengage with a drive block 20 as one of said blocks enters the trolley aperture and engages against the abutment 31 on the drive dog member 26.

A spacer means is connected to each trolley and may be in the form of an apertured plate 45 which may be fastened to the underside of the guide shoe by threaded members 46. These spacer members not only function to maintain spacing between the trolleys in the grouping area 41, but also act to intermittently move the trolleys through said area by engagement with adjacent spacer members.

In the embodiment of Figs. 5 and 6, a trolley 50 is formed of parts 51 and 52 which are interconnected together by machine screws 53 and 54 and has horns 55 and 56 carrying wheels 57 and 58, respectively. Similarly, to the embodiment of Figs. 1 to 4, the wheels 57 and 58 roll on a flange 59 of an I-shaped guide rail 60. The trolley has a chain-receiving aperture formed by inner walls 61 and 62 of trolley parts 51 and 52, a guide shoe 63, and overhead inturned flanges 64 and 65 on the trolley parts 51 and 52. The trolley is formed with an eye 66 near a lower end from which an article may be suspended.

In this embodiment of Figs. 5 and 6, the guide shoe 63 is formed with abutments 67 and 68 positioned for engagement by a hold back dog member 69 and a drive dog member 70. The drive dog member 70 is pivotally mounted on a pin 71 extending between a pair of plates 72 and 73 which have ears 72a and 73a extending therefrom which may be secured to a chain 74 by pins 74a and 74b. Another pin 75 extending between the plates functions to limit pivoting movement of the dog member in one direction. The dog member 70 has an abutment engaging surface 76 engageable with the abutment 68 and has an upwardly extending trip portion 77.

The hold back dog member 69 is pivotally mounted on a pin 78 extended between plates one of which is shown at 79 which may be secured to links of the chain 74 by ears 79a and 79b and pins 79c and 79d. Another pin 80 extending between the plates forms a stop for limiting movement of this dog member in one direction.

As in the embodiment of Figs. 1–4, a trip bar 81 may be secured to the underside of the guide rail and be positioned for engagement by the trip 77 of a drive dog member 70 when it is desired to leave the particular trolley in the grouping area.

In the embodiment of Figs. 5 and 6, the hold back dog member 69 functions to prevent movement of the trolley along the chain when moving downhill, but may freely pivot out of the way as it passes through a trolley aperture since the direction of movement of the chain 74 is toward the left, as viewed in Fig. 5. The disengaged position of the drive dog member 70 is shown in dotted lines in Fig. 5.

Spacer means in the form of an apertured plate 82 may be secured to the underside of the guide shoe 63 by the machine screws 83 to perform the same functions as the spacer plate 45 in the embodiments of Figs. 1–4.

In the cross bar conveyor embodiment in Figs. 7 and 8, a cross bar 85 may have articles suspended therefrom as by a hook 86 and the ends of each cross bar may have a trolley secured thereto as by welding, one of said trolleys being shown at 87. This trolley has ears 88 and 89 between which pins 90 and 91 are extended. A drive dog member 92 is pivotally mounted on the pin 90 and a hold back dog member 93 is pivotally mounted on the pin 91. The dog members are urged toward an aperture in the trolley through which a chain 94 may extend by springs 95 and 96, respectively, connected between the ear 88 of the trolley and the dog members. The dog members have interengaging parts 97 and 98 so that movement of the dog member 93 results in movement of dog member 92 and the hold back dog member 93 has a trip 99 positioned for engagement with a trip bar 110, shown in dotted lines in Fig. 7, so as to cause movement of the dog members when the trip 99 engages the trip bar. This trip bar may be mounted on a suitable frame member. A pin 100 limits movement of the dog members toward the trolley aperture.

The chain 94 is generally similar to that illustrated in the embodiments of Figs. 1–4 in that a drive block 101 is connected between links of the chain 94 and is engageable wtih an abutment 102 on the drive dog 92 and an abutment 103 on the hold back dog member 93 when the trolley is traveling downhill.

A lateral guide shoe 104 is provided for guiding the chain as well as the guide shoe 105 disposed beneath the chain. Spacer means in the form of plates 106 and 107 may be secured to the cross bar 85 as by welding to perform a function similar to that performed by the spacer means 45 in the embodiment shown in Figs. 1-4.

In this embodiment the cross bars 85 may be spaced apart a greater distance than the length of the article carried thereby to allow vertical travel of the conveyor into a treating tank while on the horizontal run through the tank the cross bars can be grouped as closely as desired to suit the horizontal dimension of the work by release of trolleys from the chain. This results in slowing the travel of the articles through the tank and makes it possible to shorten the tank and still obtain the same amount of treament time for an article in the tank.

I claim:

1. A grouping conveyor mechanism comprising, a guide rail defining a path of travel, a drive chain generally coextensive with the guide rail and having drive blocks spaced along the chain, means driving said chain, a plurality of trolleys mounted on the guide rail and each having means defining an aperture through which the chain and drive blocks may pass, each trolley having a pair of spaced-apart pins extending transversely of the trolley and located above said aperture, a drive dog member pivotally mounted on one of said pins and a tail dog member pivotally mounted on the other pin, said dog members extending toward each other and having interengaging parts for causing pivoting movement together, said dog members also having abutmenting engagement with one of said drive blocks, a stop projecting from the trolley limiting movement of said dog members toward said aperture, a guide shoe for the chain positioned on said trolley beneath the aperture to support the chain, spacer means on said trolleys for determining minimum distance between trolleys in a grouping area, means on said trolley for supporting an article from the trolley, and a trip bar positioned at said grouping area and engageable with one of said dog members on each trolley in said area to maintain the dog members out of engagement with drive blocks on the chain passing through the trolley apertures.

2. A grouping conveyor mechanism comprising, a guide rail defining a path of travel, a conveyor element generally coextensive with the guide rail and having drive blocks spaced therealong, means driving said element, a plurality of trolleys mounted on the guide rail and each having means defining an aperture through which the element and drive blocks may pass, each trolley having, a pivotally mounted drive dog member, a pivotally mounted tail dog member, said dog members extending toward each other and having interengaging parts for pivoting movement together and also having abutments for engagement with one of said drive blocks, and means on said trolley for supporting an article from the trolley, and a trip bar positioned at said grouping area and engageable with one of said dog members on each trolley in said area to maintain the dog members out of engagement with drive blocks on the element passing through the trolley apertures.

3. In a grouping conveyor mechanism, in combination, a guide rail defining a path of travel, a drive chain generally coextensive with the guide rail, means driving said chain, a plurality of trolleys mounted on the guide rail and each having means defining an aperture through which the chain may pass, each trolley having a guide shoe extending beneath and at opposite sides of the aperture to guide the chain for movement relative to the trolley, said guide shoe having leading and trailing abutments, means connected to each trolley for supporting an article therefrom, a plurality of spaced pairs of dog members mounted on the chain and each pair including a hold back dog member and a drive dog member, the mounting for each dog member including a pair of laterally spaced-apart plates connected to the chain and interconnected by a pair of pins one of which forms a pivot for the associated dog member and the other of which forms a stop limiting pivoting of the dog member in an abutment engaging direction, each dog member having an abutment engaging portion extending beneath the chain and positioned for engagement with said abutments when in engagement with the pins forming the stops therefor, spacer means on each trolley for determining minimum distance between trolleys when in a grouping area, and a trip bar positioned at a grouping area and engageable with said drive dog member of each pair of dog members to maintain the drive dog out of engagement with the associated abutment on successive guide shoes to permit continued movement of the chain with respect to the trolley.

4. A grouping conveyor mechanism comprising, a guide rail defining a path of travel, a drive chain generally coextensive with the guide rail, means driving said chain, a plurality of trolleys mounted on the guide rail and each having means defining an aperture through which the chain may pass, each trolley also having leading and trailing abutments, a plurality of spaced pairs of spaced-apart pins extending transversely of and on the chain, a drive dog member pivotally mounted on one of said pins and a tail dog member pivotally mounted on the other pin, said dog members having abutments positioned for engagement with said leading and trailing abutments, stops projecting from the chain limiting movement of said dog members in one direction, a guide shoe for the chain positioned on each trolley beneath the aperture to support the chain, spacer means for determining minimum distance between trolleys in a grouping area, means connected to the trolley for supporting an article therefrom, and a trip bar positioned at said grouping area and engageable with the drive dog member of each pair in said area to maintain the drive dog member out of engagement with the trailing abutment of the trolleys.

References Cited in the file of this patent
UNITED STATES PATENTS

| 1,420,115 | Lange et al. | June 20, 1922 |
| 1,875,535 | Whitney | Sept. 6, 1932 |
| 1,921,109 | Webb et al. | Aug. 8, 1933 |
| 2,510,318 | Rose | June 6, 1950 |
| 2,586,264 | Rose | Feb. 19, 1952 |
| 2,593,699 | Rose | Apr. 22, 1952 |
| 2,612,847 | Burrows | Oct. 7, 1952 |
| 2,751,852 | Joy | June 26, 1956 |

FOREIGN PATENTS

| 1,072,898 | France | Mar. 17, 1954 |
| 701,610 | Great Britain | Dec. 30, 1953 |